United States Patent
Shigemitsu

(10) Patent No.: US 9,888,181 B2
(45) Date of Patent: Feb. 6, 2018

(54) CAMERA MODULE AND IMAGE CAPTURING APPARATUS WITH SHAKE CORRECTION OF IMAGE CAPTURING LENS OR IMAGE SENSOR

(71) Applicant: Sharp Kabushiki Kaisha, Sakai-shi, Osaka (JP)

(72) Inventor: Norimichi Shigemitsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/117,212

(22) PCT Filed: Nov. 17, 2014

(86) PCT No.: PCT/JP2014/080363
§ 371 (c)(1),
(2) Date: Aug. 8, 2016

(87) PCT Pub. No.: WO2015/129106
PCT Pub. Date: Sep. 3, 2015

(65) Prior Publication Data
US 2016/0360112 A1    Dec. 8, 2016

(30) Foreign Application Priority Data
Feb. 28, 2014  (JP) .................. 2014-039536

(51) Int. Cl.
*H04N 5/232*  (2006.01)
*G02B 27/64*  (2006.01)
(Continued)

(52) U.S. Cl.
CPC ..... *H04N 5/23287* (2013.01); *G02B 13/0005* (2013.01); *G02B 27/64* (2013.01);
(Continued)

(58) Field of Classification Search
CPC .................................................. H04N 5/23287
See application file for complete search history.

(56) References Cited

U.S. PATENT DOCUMENTS 4,848,882 A * 7/1989 Suzuki .................. G02B 6/425
                                                    359/652
5,446,581 A * 8/1995 Jamieson .......... G02B 13/0005
                                                    359/356
(Continued)

FOREIGN PATENT DOCUMENTS

JP    10-233950 A    9/1998
JP    2004-358550 A  12/2004
(Continued)

OTHER PUBLICATIONS

NPL: Defition of proportionate; Merrian-Webster Online Dictionary; https://www.merriam-webster.com/dictionary/proportionate.*
(Continued)

*Primary Examiner* — Roberto Velez
*Assistant Examiner* — Cynthia Segura
(74) *Attorney, Agent, or Firm* — Keating & Bennett, LLP

(57) ABSTRACT

Disclosed is a camera module that is compact and has a low manufacturing cost, and is capable of correcting blur in a captured image more favorably. An image capturing lens (103) is configured so that a size of an image that an image capturing lens (103) forms is proportionate to an angle at which a principal ray from an object (200) is incident to the image capturing lens (103).

6 Claims, 11 Drawing Sheets

(51) Int. Cl.
*G02B 5/02* (2006.01)
*G02B 13/00* (2006.01)
*H04N 5/225* (2006.01)
*G03B 5/02* (2006.01)

(52) U.S. Cl.
CPC ............ *G02B 27/646* (2013.01); *G03B 5/02* (2013.01); *H04N 5/2253* (2013.01); *H04N 5/2254* (2013.01); *H04N 5/2257* (2013.01); *G03B 2205/0015* (2013.01)

(56) References Cited

U.S. PATENT DOCUMENTS

| | | | |
|---|---|---|---|
| 6,873,358 | B1 | 3/2005 | Shimizu |
| 7,161,621 | B2 * | 1/2007 | Kai .................. G03B 17/48 250/239 |
| RE42,898 | E | 11/2011 | Shimizu et al. |
| 8,243,149 | B2 * | 8/2012 | Chiang ............ H04N 5/23248 348/208.5 |
| 2005/0237418 | A1 * | 10/2005 | Sakamoto ............ G02B 7/026 348/340 |
| 2006/0087562 | A1 * | 4/2006 | Nakanishi .......... H04N 5/23248 348/208.12 |
| 2006/0193064 | A1 * | 8/2006 | Kim ..................... G02B 3/12 359/811 |
| 2007/0097516 | A1 | 5/2007 | Ohtake et al. |
| 2008/0247596 | A1 * | 10/2008 | Nishiuchi ............... G06T 7/73 382/100 |
| 2009/0225171 | A1 | 9/2009 | Shabtay et al. |
| 2010/0245629 | A1 * | 9/2010 | Nanba .................. G02B 15/177 348/240.1 |
| 2011/0019075 | A1 * | 1/2011 | Chiang ............ H04N 5/23248 348/374 |
| 2013/0182136 | A1 | 7/2013 | Ishizue |
| 2013/0258497 | A1 * | 10/2013 | Aoi ..................... G02B 15/17 359/688 |
| 2014/0184854 | A1 * | 7/2014 | Musatenko ........ H04N 5/23296 348/240.2 |
| 2014/0184895 | A1 * | 7/2014 | Ahn ..................... G02B 13/004 348/369 |
| 2017/0131403 | A1 * | 5/2017 | Lin ..................... G01S 7/4814 |

FOREIGN PATENT DOCUMENTS

| | | |
|---|---|---|
| JP | 2006-129175 A | 5/2006 |
| JP | 2007-121650 A | 5/2007 |
| JP | 2009-531723 A | 9/2009 |
| JP | 2012-068540 A | 4/2012 |

OTHER PUBLICATIONS

NPL: Defition of proportional; Merrian-Webster Online Dictionary; https://www.merriam-webster.com/dictionary/proportional.*
Official Communication issued in International Patent Application No. PCT/JP2014/080363, dated Feb. 17, 2015.

* cited by examiner

CAMERA MODULE AND IMAGE CAPTURING APPARATUS WITH SHAKE CORRECTION OF IMAGE CAPTURING LENS OR IMAGE SENSOR

TECHNICAL FIELD

The present invention relates to a camera module and an image capturing apparatus that are provided with an Optical Image Stabilizer (OIS) that shifts at least one of an image capturing lens and an image sensor.

BACKGROUND ART

In the related art, apparatuses that correct blur in a captured image, which is caused by camera shake, and are provided with an OIS, are put into practical use, as image capturing apparatuses such as digital video cameras and digital still cameras.

An OIS includes a gyro sensor that detects inclination of an image capturing apparatus due to camera shake using an angular velocity, or the like. Further, the OIS shifts an image capturing lens or an image sensor in a normal direction with respect to an optical axis of the image capturing lens on the basis of an output signal of the gyro sensor. As a result of this, the OIS corrects blur in a captured image that is caused by relative shift of a light reception surface of an image sensor and an optical axis of an image capturing lens.

Due to a function of the OIS, in an image capturing apparatus, it is possible to control unsharpness in a captured image by correcting blur in a captured image that is caused by camera shake.

In particular, a lens shift type OIS that shifts an image capturing lens is widely used since such an OIS can be configured using a compact configuration that shifts an image capturing lens. Meanwhile, in a lens shift type OIS, a problem is sufficiently correcting blur that occurs in a peripheral portion of a captured image. A peripheral portion of a captured image refers to the edges of a captured image and the vicinity thereof.

Examples of techniques that solve the above-mentioned technical problem include the techniques disclosed in PTLs 1 and 2.

PTL 1 discloses a technique that carries out image processing for correcting distortion in a captured image.

PTL 2 discloses a technique that suppresses a strain component, which is caused by inclination of an image capturing apparatus during camera shake, by optimizing distortion of an image capturing lens.

CITATION LIST

Patent Literature

PTL 1: Japanese Unexamined Patent Application Publication No. 2006-129175 (Publication date: May 18, 2006)
PTL 2: Japanese Unexamined Patent Application Publication No. 2012-68540 (Publication date: Apr. 5, 2012)

SUMMARY OF INVENTION

Technical Problem

In the technique that is disclosed in PTL 1, a complex image process is performed. Therefore, in the technique that is disclosed in PTL 1, a high performance Image Signal Processor (ISP) is necessary to execute digital correction. As a result of this, in the technique that is disclosed in PTL 1, a processing amount by an apparatus for image processing, is increased, and as a result, a problem occurs in that this leads to an increase in the size and an increase in the cost of the image capturing apparatus.

In particular, in a case in which a captured image is a moving image, in the image capturing apparatus, there is a state in which camera shake constantly occurs. In this case, in the technique that is disclosed in PTL 1, it is necessary to install high capacity buffer memory in order to perform correction at high speed, to install more batteries depending on increases in the power consumption in order to drive a circuit on a steady basis. As a result of this, in the technique that is disclosed in PTL 1, an increase in the size and an increase in the cost of the image capturing apparatus become more significant.

In the technique that is disclosed in PTL 2, the correction of blur in a captured image is still not sufficient. The reasons for this will be described below.

A size of an image that is formed by an image capturing lens is proportionate to a tangent of an angle at which a principal ray from an object is incident to an image capturing lens. As a result of this, in a range of 0 to $\pi/2$ rad, the size of an image of an object increases as the angle increases. In correction that uses such an image capturing lens, it is difficult to perform correction that depends on the size of the image of the object. In the technique that is disclosed in PTL 2, since the above-mentioned point is not taken into consideration, there is room for improvement in correcting blur in a captured image more favorably.

In addition, in the technique that is disclosed in PTL 2, since minus distortion is applied to a maximum image height region of an image capturing lens, it is possible to increase a peripheral light quantity ratio (a proportion of light quantity of the periphery of an image with respect to a light quantity of the center of an image) of a captured image, and therefore, it is possible to improve blur in a peripheral portion of a captured image. Meanwhile, distortion is plus distortion in an intermediate image height region of an image capturing lens, and as a result, the blur of an intermediate portion of a captured image, is increased. An intermediate portion of a captured image refers to a band between a central portion of a captured image (the center of a captured image and the vicinity thereof) and a peripheral portion of a captured image.

The present invention is devised in the light of the above-mentioned technical problem, and an object thereof is to provide a camera module and an image capturing apparatus that are compact and having a low manufacturing cost, and are capable of correcting blur in a captured image more favorably.

Solution to Problem

In order to solve the above-mentioned technical problem, a camera module according to an aspect of the present invention includes an image capturing lens, an image sensor that receives light that passes through the image capturing lens, and an optical camera shake correction mechanism that shifts at least one of the image capturing lens and the image sensor in a normal direction with respect to an optical axis of the image capturing lens, depending on an angle at which a principal ray from an object is incident to the image capturing lens, and a size of an image that the image capturing lens forms, is proportionate to the above-mentioned angle.

In addition, in order to solve the above-mentioned technical problem, an image capturing apparatus according to an aspect of the present invention is provided with the camera module according to an aspect of the present invention, and includes an image processing unit that carries out an image process on an output signal of the image sensor of the camera module.

Advantageous Effects of Invention

According to an aspect of the present invention, it is possible to correct blur in a captured image more favorably with a compact module having a low manufacturing cost.

BRIEF DESCRIPTION OF DRAWINGS

FIG. 3(a) shows before correction, and FIG. 3(b) shows after correction.

DESCRIPTION OF EMBODIMENTS

Outline of Invention

In a camera module geared toward compact equipment, a lens shift type OIS that shifts an image capturing lens with respect to an image sensor, is widely used. A lens shift type OIS suppresses blur in an image of an object, which arises due to camera shake, by canceling shifting of the image.

Further, a camera module and an image capturing apparatus of the present invention are configured so that a size of an image that an image capturing lens forms is proportionate to an angle at which a principal ray from an object is incident to the image capturing lens.

As a result of this, since the size of an image of an object is constant regardless of the above-mentioned angle, it is possible to sufficiently correct blur in a captured image by merely shifting the image capturing lens. The effect of the present invention increases in significance the closer the above-mentioned angle is to π/2 rad.

It is possible to use a so-called fθ lens as the above-mentioned image capturing lens. An fθ lens is a lens in which the size of an image that the fθ lens forms is proportionate to an incidence angle θ of light with respect to the fθ lens, and a distortion property dist. thereof is defined in the following manner.

$$\text{dist.} = 100 \times (\theta - \tan\theta)/\tan\theta\ (\%)$$

In addition, if distortion of the image capturing lens is minus distortion, the size of a captured image becomes smaller. As a result of this, since it is possible to ensure a margin of an effective image circle diameter with respect to a captured image, it is possible to perform suitable correction of larger camera shake.

[Embodiment 1]
[Configuration of Image Capturing Apparatus]

Hereinafter, for convenience of description, members and variables having the same functions in a practical sense as previously described members and variables will be given the same symbols and description thereof will be omitted.

Figure 2:
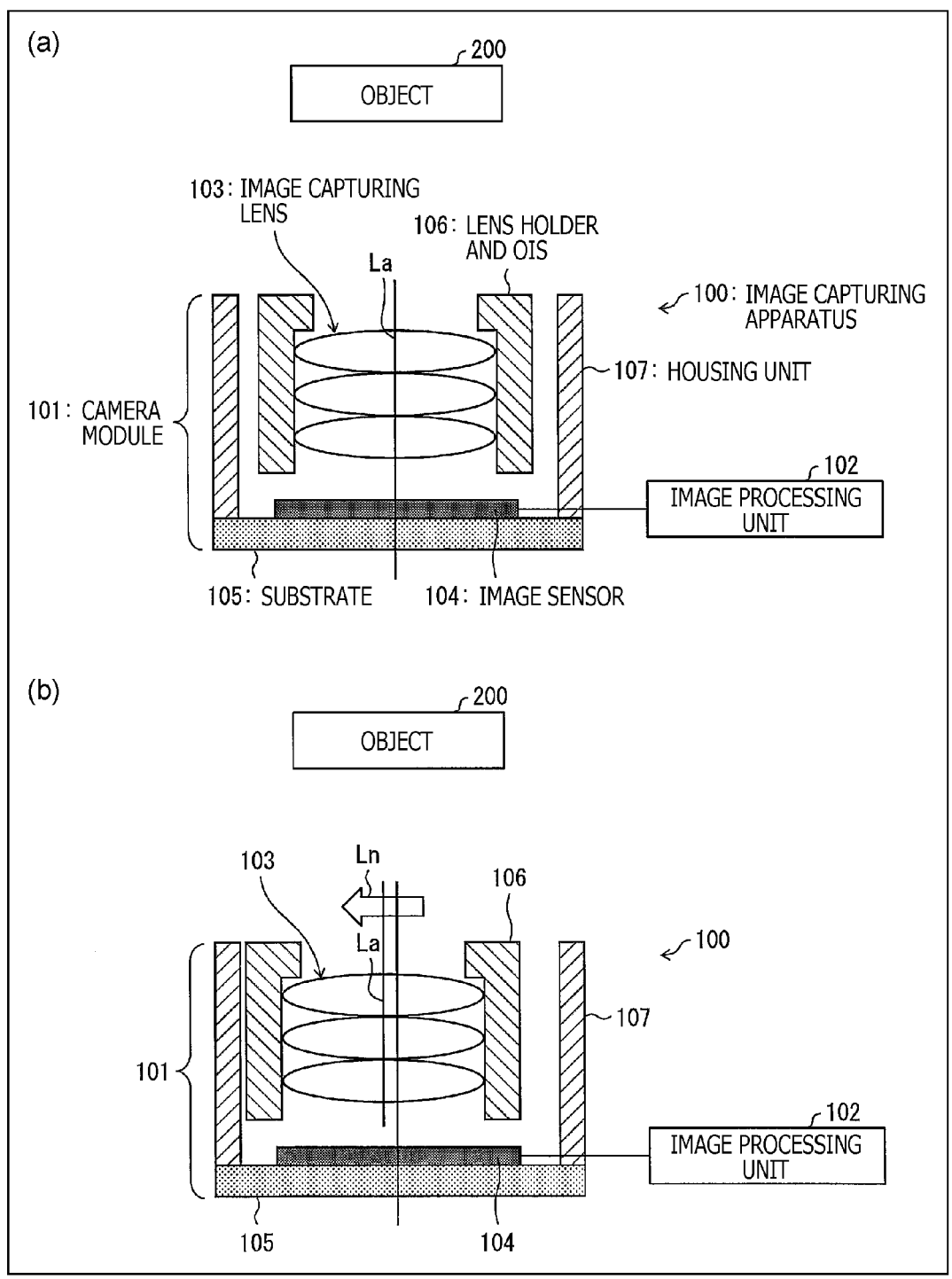
FIG. 2(a) is a cross-sectional view that shows a configuration of an image capturing apparatus according to embodiment 1 of the present invention.
FIG. 2(b) is a cross-sectional view that briefly describes function of an OIS unit in the image capturing apparatus that is shown in FIG. 2(a).

FIG. 2(a) is a cross-sectional view that shows a configuration of an image capturing apparatus according to embodiment 1, and FIG. 2(b) is a cross-sectional view that briefly describes functions of an OIS unit in the image capturing apparatus that is shown in FIG. 2(b).

An image capturing apparatus 100, which is shown in FIGS. 2(a) and 2(b), is provided with a camera module 101 and an image processing unit 102.

The camera module 101 is provided with an image capturing lens 103, an image sensor 104, a substrate 105, a lens holder, an optical image stabilizer (OIS) 106, and a housing unit 107.

The image capturing lens 103 forms an image of an object 200, and includes at least one lens. In FIG. 2(a), for convenience of illustration and description, three lenses are illustrated, but the number of lenses is not limited to three. Additionally, hereinafter, the same member number will be applied to image capturing lenses having the same function regardless of the number of lenses that configure the image capturing lenses. A specific configuration of the image capturing lens 103 will be described later.

The image sensor 104 receives light that passes through the image capturing lens 103, and outputs an electric signal that is obtained through photoelectric conversion of received light. For example, the image sensor 104 is configured using a Charge Coupled Device (CCD) or a Complementary Metal Oxide Semiconductor (CMOS).

The substrate 105 is a component on which the image sensor 104 and the housing unit 107 are mounted.

The lens holder and the OIS 106 include a lens holder unit and an OIS unit. The lens holder unit is a component in which the image capturing lens 103 is accommodated. The OIS unit is a component that shifts the image capturing lens 103 in a normal direction Ln by moving the lens holder unit in the normal direction Ln with respect to an optical axis La of the image capturing lens 103 (refer to FIG. 2(b)).

The housing unit 107 is mounted on the substrate 105, and covers the image sensor 104, the lens holder and the OIS 106. In addition, a portion of the housing unit 107 that configures a side surface of the image capturing apparatus 100 may also function as the OIS unit (in the manner of the rectangular tube unit 23a of PTL 2).

The image processing unit 102 is a component that creates a captured image of the image capturing apparatus 100 by carrying out an image process on an output signal, which indicates an image that the camera module 101 captures, (an electric signal) of the image sensor 104. The image process by the image processing unit 102 will be mentioned later.

In this instance, the image capturing lens 103 is configured so that a size of an image that the image capturing lens 103 forms is proportionate to an angle at which a principal ray from the object 200 is incident to the image capturing lens 103.

Additionally, in the specification of the present invention, the term "a size of an image that the image capturing lens forms" not only refers to a size of an image of an object, but also refers to an overall size of an image that is obtained as a result of an image capturing lens forming light that is incident to the image capturing lens into an image.

A so-called fθ lens can be included as a specific example of the image capturing lens 103. An fθ lens is a lens in which the size of an image that the fθ lens forms is proportionate to an incidence angle of light with respect to the fθ lens. Generally, the image capturing lens 103, which is an fθ lens, has minus distortion.

As a result of this, since the size of an image of the object 200 is constant regardless of the above-mentioned angle, it is possible to sufficiently correct blur in a captured image by merely shifting the image capturing lens 103. A characteristic effect of the image capturing apparatus 100 increases in significance the closer the above-mentioned angle is to π/2 rad.

In addition, since it is not necessary set the distortion of the image capturing lens to be plus distortion in an intermediate image height region, it is possible to suppress blur in an intermediate portion of a captured image.

In addition, in a case in which the image capturing lens 103 has minus distortion, since it is possible to make a peripheral light quantity ratio of a captured image larger, it is suitable for reducing noise that is caused by shading correction.

[Principles of Functions of OIS Unit]

Figure 3:
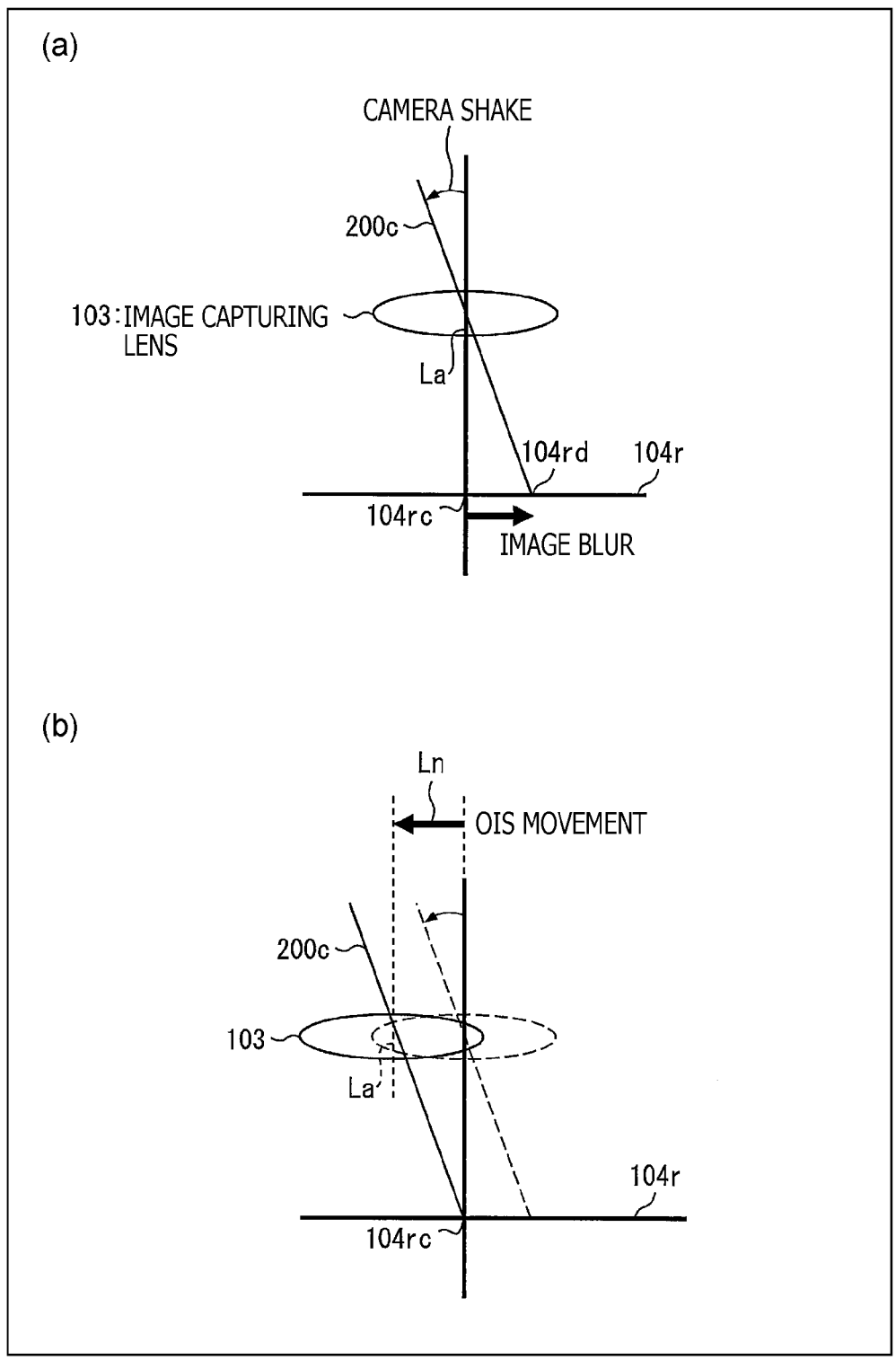
FIGS. 3(a) and 3(b) are views that describe principles of the functions of the OIS unit.

FIGS. 3(a) and 3(b) are views that describe principles of the functions of the OIS unit, FIG. 3(a) shows before correction, and FIG. 3(b) shows after correction.

In FIGS. 3(a) and 3(b), in order to shorten the description, description is given focusing on a principal ray 200c that configures a comparative example of the object 200.

The principal ray 200c passes through the image capturing lens 103, and is guided to a light reception surface 104r of the image sensor 104.

In a case in which the principal ray 200c follows the optical axis La, the principal ray 200c is guided to a center 104rc of the light reception surface 104r, and it is not necessary to perform correction using the OIS unit.

In this instance, in a case in which camera shake arises, the principal ray 200c is inclined with respect to the optical axis La. In this case, if the positions of the image capturing lens 103 and the light reception surface 104r are fixed, as shown in FIG. 3(a), the principal ray 200c is guided to a position 104rd, which is separated from the center 104rc. The principal ray 200c being guided to the position 104rd is the principal cause of blur in a captured image.

In such an instance, in order to overcome the above-mentioned principal cause, as shown in FIG. 3(b), the OIS unit shifts the image capturing lens 103 in the normal direction Ln so that the principal ray 200c, which is inclined with respect to the optical axis La as a result of camera shake, is guided to the center 104rc. As a result of this, in the image capturing apparatus 100, it is possible to correct blur in a captured image that is caused by camera shake.

[Comparison of Images Image Capturing Lens Forms]

Figure 4:
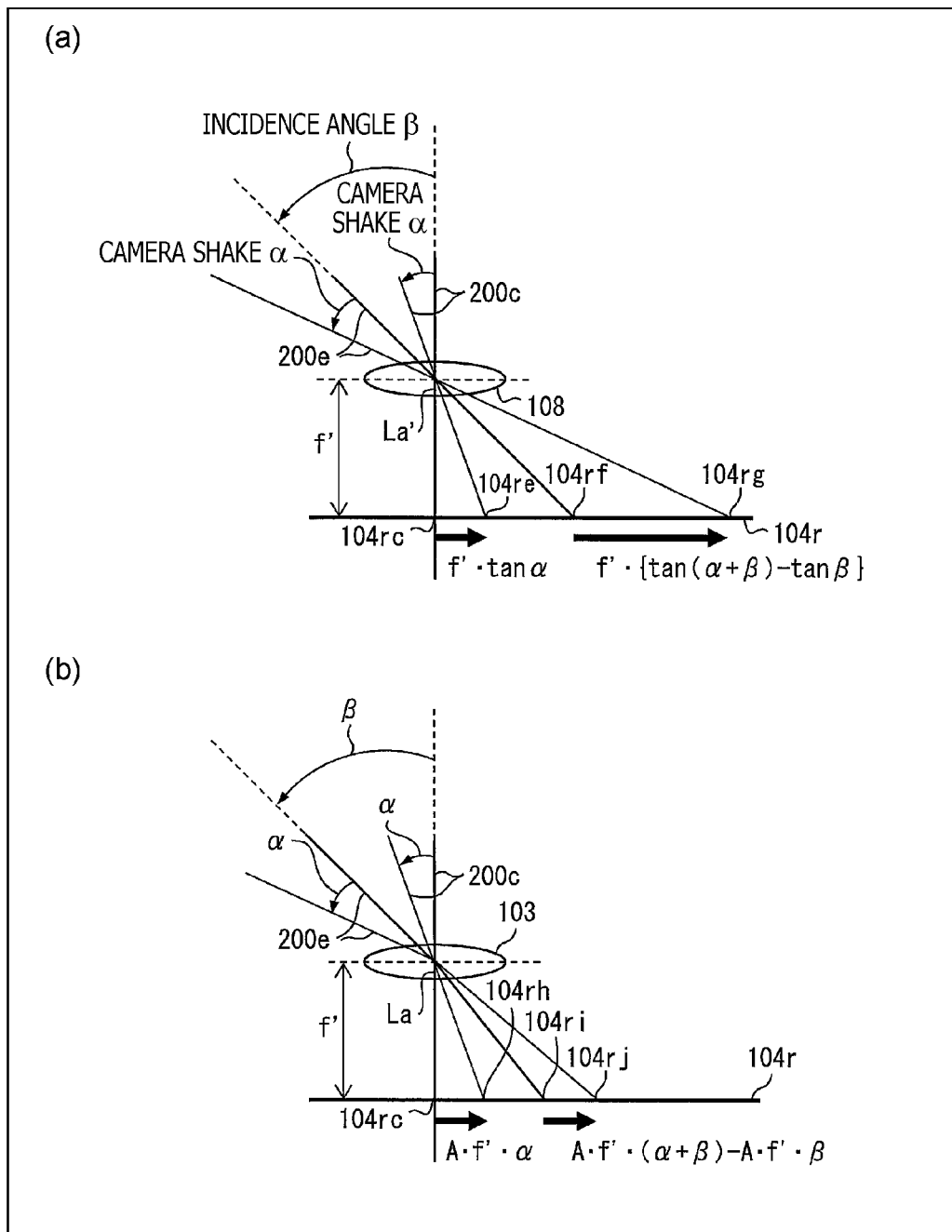
FIG. 4(a) is a view that describes an image that the image capturing lens according to the related art forms.
FIG. 4(b) is a view that describes an image that the image capturing lens according to embodiment 1 of the present invention forms.

FIG. 4(a) is a view that describes an image that the image capturing lens according to the related art forms, and FIG. 4(b) is a view that describes an image that the image capturing lens according to embodiment 1 forms.

An image capturing lens 108 that is shown in FIG. 4(a) is an image capturing lens in which a size of an image that the image capturing lens 108 forms is proportionate to a tangent of an angle at which a principal ray from the object 200 is incident to the image capturing lens 108.

In a case in which the principal ray 200c follows an optical axis La' of the image capturing lens 108, the principal ray 200c is guided to the center 104rc of the light reception surface 104r.

On the other hand, in a case in which camera shake in which the angle at which the principal ray 200c is incident to the image capturing lens 108, is inclined by a, arises, the principal ray 200c is guided to a position 104re of the light reception surface 104r.

In this instance, an amount of displacement from the center 104rc to the position 104re can be expressed as "f×tan α". In this instance, f is a distance from the center of the image capturing lens to the light reception surface of the image sensor. In other words, if the angle at which the principal ray 200c is incident to the image capturing lens 108, is inclined by α due to camera shake, a position to which the principal ray 200c is guided is shifted by "f×tan α".

In addition, in a case in which the principal ray 200c follows an optical axis La' of the image capturing lens 108, a principal ray 200e, which configures an edge of an image of the object 200, is guided to a position 104rf of the light reception surface 104r.

On the other hand, in a case in which camera shake in which the angle at which the principal ray 200c is incident to the image capturing lens 108, is inclined by a, arises, the principal ray 200e also has the same inclination, and the principal ray 200e is guided to a position 104rg of the light reception surface 104r.

In this instance, an amount of displacement from the position 104rf to the position 104rg can be expressed as "f×{tan (α+β)−tan β}". In this instance, β is an angle that is formed by the principal ray 200c and the principal ray 200e. In other words, if the angle at which the principal ray 200c is incident to the image capturing lens 108, is inclined by a due to camera shake, a position to which the principal ray 200e is guided is shifted by "f×{tan (α+β)−tan β}".

It can be understood from the above-mentioned points that an amount of shift is different in the center and at the edge of an image of the object 200 in a case in which the above-mentioned camera shake arises. In other words, the size of an image of the object 200 changes dependent on a value of the angle α. More specifically, an image of the object 200 increases in size as the angle α increases.

On the other hand, the image capturing lens 103 that is shown in FIG. 4(b) is an image capturing lens in which a size of an image that the image capturing lens 103 forms is proportionate to an angle at which a principal ray from the object 200 is incident to the image capturing lens 103.

In a case in which the principal ray 200c follows the optical axis La of the image capturing lens 103, the principal ray 200c is guided to the center 104rc.

On the other hand, in a case in which camera shake in which the angle at which the principal ray 200c is incident to the image capturing lens 103, is inclined by α, arises, the principal ray 200c is guided to a position 104rh of the light reception surface 104r.

In this instance, an amount of displacement from the center 104rc to the position 104rh can be expressed as "A×f×α". In this instance, A is a predetermined proportionality coefficient. In other words, the amount of displacement is proportionate to f×α. In other words, if the angle at which the principal ray 200c is incident to the image capturing lens 103, is inclined by α due to camera shake, a position to which the principal ray 200c is guided is shifted by "A×f×α".

In addition, in a case in which the principal ray 200c follows the optical axis La of the image capturing lens 103, the principal ray 200e is guided to a position 104ri of the light reception surface 104r.

On the other hand, in a case in which camera shake in which the angle at which the principal ray 200c is incident to the image capturing lens 103, is inclined by α, arises, the principal ray 200e also has the same inclination, and the principal ray 200e is guided to a position 104rj of the light reception surface 104r.

In this instance, an amount of displacement from the position 104ri to the position 104rj can be expressed as "A f×(α+β)−A×f×β". However, this becomes "A×f×α" when rearranged, and is equivalent to an amount of displacement from the center 104rc to the position 104rh. In other words, if the angle at which the principal ray 200c is incident to the image capturing lens 103, is inclined by α due to camera shake, a position to which the principal ray 200e is guided is shifted by "A×f×α".

It can be understood from the above-mentioned points that an amount of shift is the same in the center and at the edge of an image of the object 200 in a case in which the above-mentioned camera shake arises. In other words, the size of an image of the object 200 is constant regardless of the value of the angle α.

In the example that is shown in FIG. 4(a), the size of an image of the object 200 changes as a result of camera shake, but since it is not possible to handle such a change by merely shifting the image capturing lens 108, the correction of blur in a captured image is insufficient.

On the other hand, in the example that is shown in FIG. 4(b), since the size of an image of the object 200 is constant, it is possible to sufficiently perform the correction of blur in a captured image by merely shifting the image capturing lens 103.

[Details of Configuration of Image Capturing Lens]

Figure 5:
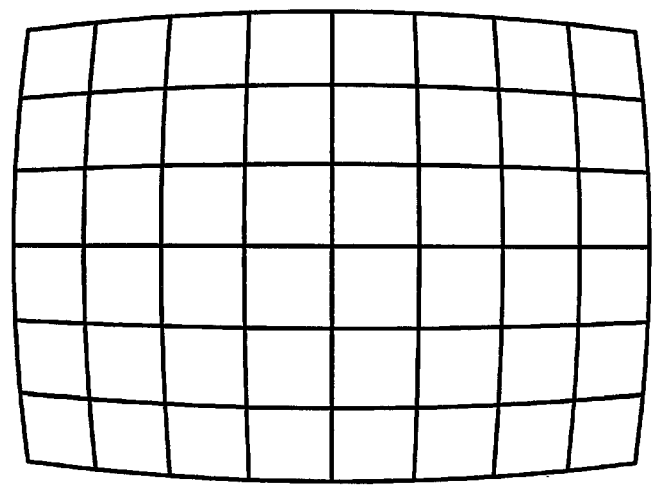
FIG. 5 is a view that shows an example of an image capturing result of a lattice chart by the image capturing apparatus according to embodiment 1 of the present invention.

FIG. 5 is a view that shows an example of an image capturing result of a lattice chart by the image capturing apparatus according to embodiment 1. Additionally, an aspect ratio of the lattice chart is 0.75.

In a case in which the image capturing lens 103 has minus distortion, an image capturing result of the lattice chart has a barrel-shaped as shown in FIG. 5.

Figure 1:
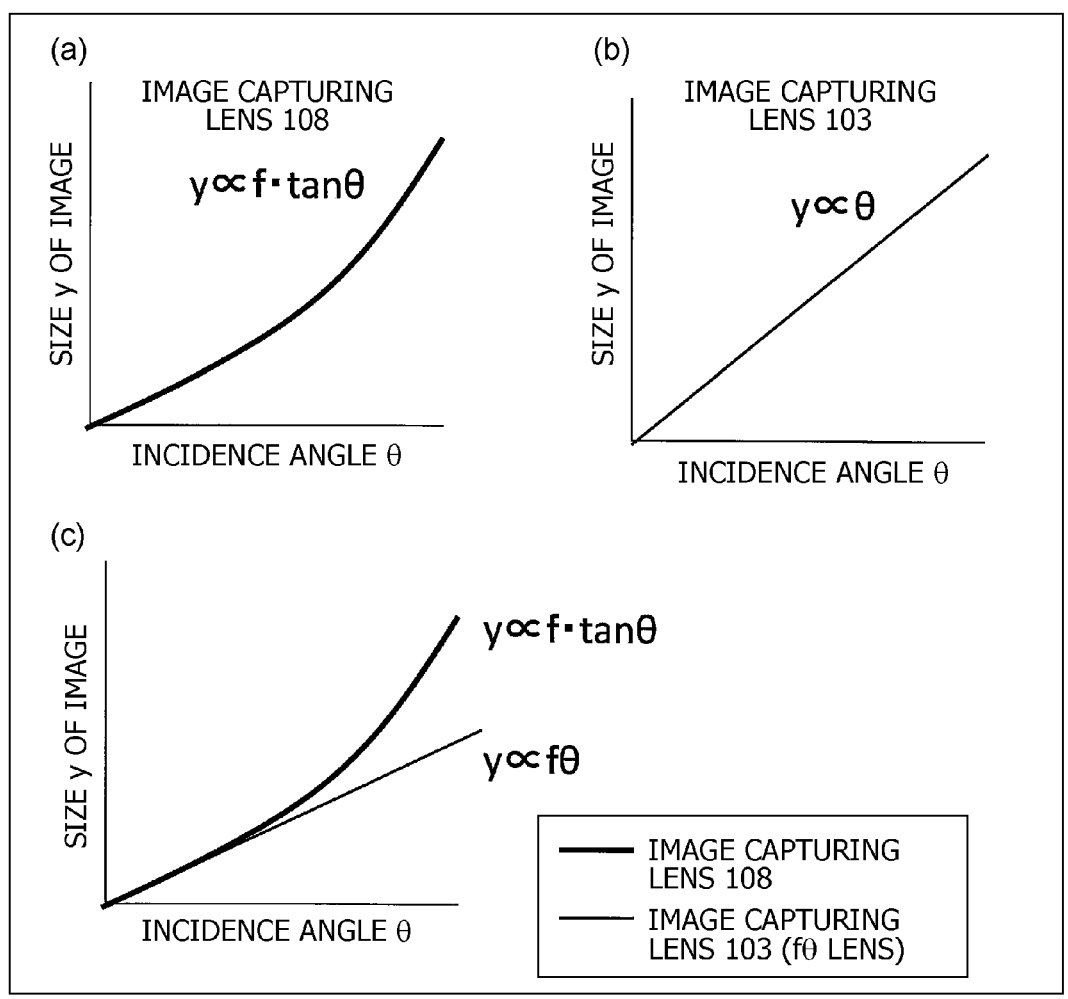
FIG. 1(a) is a graph that shows a relationship between the incidence angle and the size of an image of an image capturing lens according to the related art.
FIG. 1(b) is a graph that shows a relationship between the incidence angle and the size of an image of an image capturing lens according to embodiment 1 of the present invention.
FIG. 1(c) is a graph that compares the relationships between the incidence angle and the size of an image of the image capturing lens according to the related art, and the image capturing lens according to embodiment 1 of the present invention (an fθ lens).

FIG. 1(a) is a graph that shows a relationship between the incidence angle and the size of an image of an image capturing lens according to the related art. FIG. 1(b) is a graph that shows a relationship between the incidence angle and the size of an image of an image capturing lens according to embodiment 1. FIG. 1(c) is a graph that compares the relationships between the incidence angle and the size of an image of the image capturing lens according to the related art, and the image capturing lens according to embodiment 1 (an fθ lens).

Additionally, in FIGS. 1(a) to 1(c), the incidence angle of light with respect to the image capturing lens when the light follows the optical axis of the corresponding image capturing lens, is set as a point of origin.

According to FIG. 1(a), a size y of an image that the image capturing lens 108 forms, is proportionate to a tangent (tan θ) of the incidence angle θ of light with respect to the image capturing lens 108. Additionally, f is a focal point distance of the image capturing lens.

On the other hand, according to FIG. 1(b), the size y of an image that the image capturing lens 103 forms, is proportionate to the incidence angle θ of light with respect to the image capturing lens 103.

Furthermore, according to FIG. 1(c), when a case in which the image capturing lens 103 is an fθ lens and the image capturing lens 108 are compared, it can be understood that a difference in the size y of an image as the incidence angle θ increases, is significant.

Figure 6:
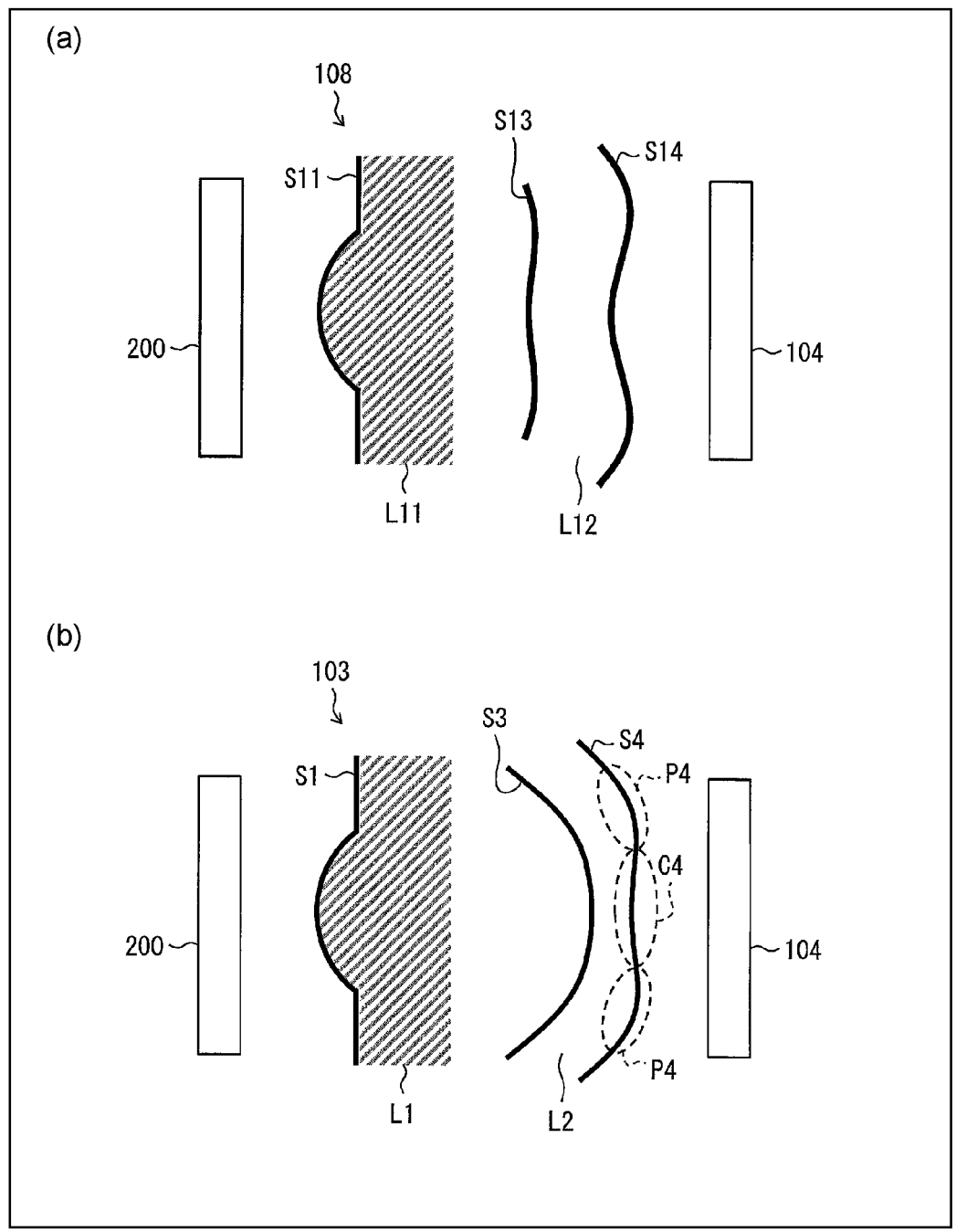
FIG. 6(a) is a view that shows a configuration example of each lens that configures the image capturing lens according to the related art.
FIG. 6(b) is a view that shows a configuration example of each lens that configures the image capturing lens according to embodiment 1 of the present invention.

FIG. 6(a) is a view that shows a configuration example of each lens that configures the image capturing lens according to the related art, and FIG. 6(b) is a view that shows a configuration example of each lens that configures the image capturing lens according to embodiment 1.

For convenience of illustration, in FIG. 6(a), only a surface S11, which faces a side of the object 200, of a lens L11, which, among each of the lenses that configure the image capturing lens 108, is positioned furthest on the side of the object 200, and a lens L12, which, among the above-mentioned lenses, is positioned furthest on a side of the image sensor 104, are illustrated. That is, other lenses may be interposed between the lens L11 and the lens L12.

The surface S11, which faces the side of the object 200, of the lens L11 has a convex form.

A central portion of a surface S13, which faces the side of the object 200, of the lens L12 has a convex form, and circumference portions, which surround the central portion, have a concave form.

A central portion of a surface S14, which faces the side of the image sensor 104, of the lens L12 has a concave form, and circumference portions, which surround the central portion, have a convex form.

On the other hand, for convenience of illustration, in FIG. 6(b), only a surface S1, which faces a side of the object 200, of a lens L1, which, among each of the lenses that configure the image capturing lens 103, is positioned furthest on the side of the object 200, and a lens L2, which, among the above-mentioned lenses, is positioned furthest on a side of the image sensor 104, are illustrated. That is, other lenses may be interposed between the lens L1 and the lens L2.

The surface S1, which faces the side of the object 200, of the lens L1 has a convex form.

A surface S3, which faces the side of the object 200, of the lens L2 has a concave form.

A central portion c4 of a surface S4, which faces the side of the image sensor 104, of the lens L2 has a concave form, and circumference portions p4, which surround the central portion c4, have a convex form.

According to the above-mentioned configuration, since it is possible to bend rays of light, which pass through the circumference portions of the image capturing lens 103 more sharply in an optical axis La direction, it is possible to easily realize an image capturing lens 103 having minus distortion.

Naturally, the number of lenses that configure the image capturing lens 103 is not limited to two, and may be three or more, or may be one. In a case in which the image capturing lens 103 is formed from three or more lenses, if various aberrations are corrected using other lenses that are provided between the lens L1 and the lens L2, it is possible to realize a lower profile image capturing lens 103.

In addition, it is not essential for the central portion c4 of the surface S4 to have a concave form.

[Image Processing Unit]

Figure 7:
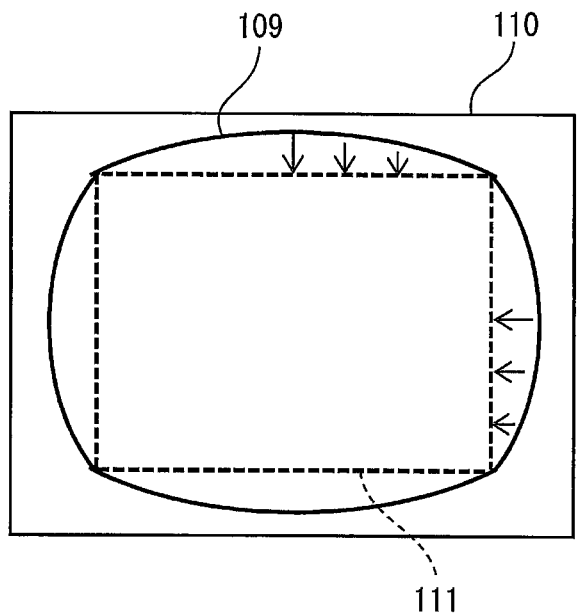
FIG. 7 is a view that describes an image process by an image processing unit.

FIG. 7 is a view that describes an image process by an image processing unit.

The image processing unit 102 is a component that digitally corrects distortion.

In a case in which the image capturing lens 103 has minus distortion, a captured image of the image capturing apparatus 100 is smaller than a case in which distortion of the image capturing lens 103 is not taken into consideration, and is barrel-shaped.

For example, according to FIG. 7, in a case in which the image capturing lens 103 is an fθ lens, a captured image 109 of the image capturing apparatus 100 before an image process is smaller than a captured image 110 of an image capturing apparatus according to the related art, which is provided with the image capturing lens 108, and is barrel-shaped.

For example, the image processing unit 102 carries out an image process on the captured image 109 on the basis of the following Equation (1). Typically, the image processing unit 102 carries out an image process on an output signal (an electric signal) of the image sensor 104.

$$IH = (f \times \theta_{max}/\tan \theta_{max}) \times \tan \theta \quad (1)$$

Additionally, IH is the size of a captured image. In addition, $\theta_{max}$ is an angle of view in a diagonal direction of the image capturing apparatus 100.

Figure 8:
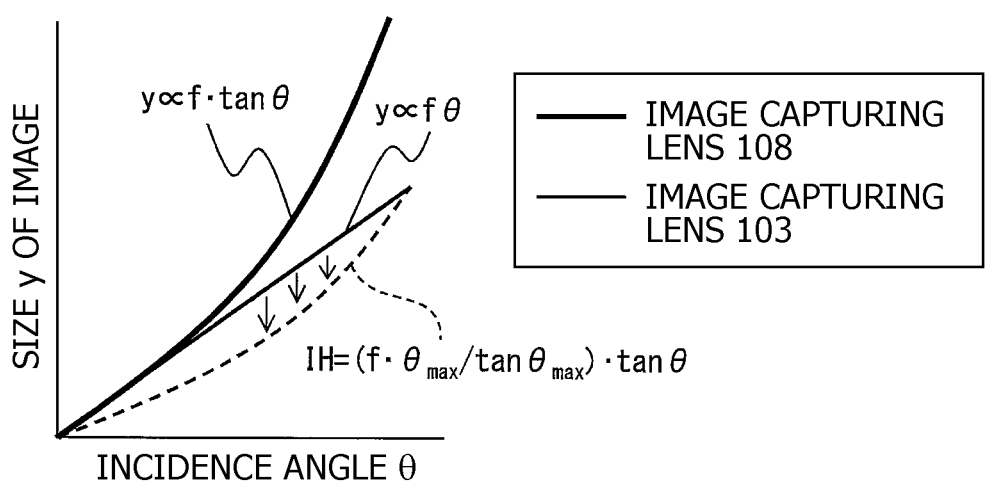
FIG. 8 is a graph in which the concept of the size of each captured image that is shown in FIG. 7, is added to the graph that is shown in FIG. 1(c).

FIG. 8 is a graph in which the concept of the size of each captured image that is shown in FIG. 7, is added to the graph that is shown in FIG. 1(c).

In FIG. 8, a thin solid line, which shows a relationship between the incidence angle and the size of an image of the image capturing lens 103, can be considered as the size of the captured image 109, and a thick solid line, which shows the same relationship of the image capturing lens 108, can be considered as the size of the captured image 110. If this is the case, the size of a captured image 111, which is obtained by performing the image process on the captured image 109, can be represented by the dotted line that is shown in FIG. 8.

According to FIG. 8, it can be understood that the captured image 109 is reduced in size to the captured image 111 as a result of the image process that is shown by Equation (1).

For example, the image processing unit 102 can be realized by a device that performs a simple image process of the extent of Equation (1). Therefore, the image processing unit 102 may merely perform a constant strain correction process, and the burden on the image processing unit 102 is small. Accordingly, it is possible to realize a compact, low-cost image capturing apparatus 100.

In addition, according to the image process that is shown by Equation (1), it is possible to achieve an improvement in the resolving power of peripheral portions of a captured image while retaining the resolving power of a central portion of a captured image.

Furthermore, according to the image process that is shown by Equation (1), it is possible to reduce the size of a captured image. Therefore, an amount of data of a captured image is reduced. In addition, since it is possible to ensure a margin of an effective image circle diameter with respect to a captured image, it is possible to perform suitable correction of larger camera shake.

EXAMPLES

Various properties of an image capturing apparatus that is provided with a 13-megapixel image capturing lens 108, and an image capturing apparatus 100 with the same specifications will be compared.

The specifications used are as follows.

13 Megapixels
Pixel Pitch: 1.12 μm
Maximum Angle of View: 72 deg
Maximum Image Size (Size of Image from Center of Image to Opposite Angles of Image Sensor): 2.9335 mm
Focal Point Distance: 4.038 mm
Camera Shake Correction Angle: 1 deg (−1 or +1 deg with respect to the optical axis of the image capturing lens)

Hereinafter, properties that are related to the image capturing apparatus provided with the image capturing lens 108 are set as "IH=f·tan θ", and properties related to the image capturing apparatus 100 will be set as "IH=f·θ".

Figure 9:
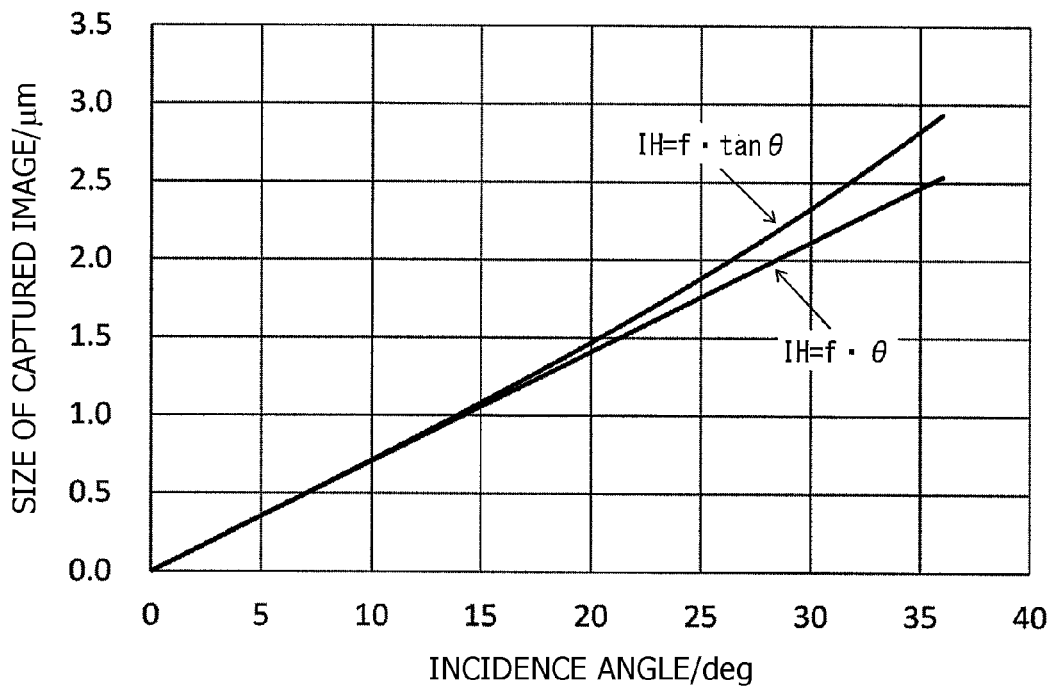
FIG. 9 is a graph in which a property of size of a captured image with respect to incidence angle is compared for an image capturing apparatus provided with the image capturing lens according to the related art and an image capturing apparatus provided with the image capturing lens according to embodiment 1 of the present invention.

FIG. 9 is a graph in which a property of size (vertical axis) of a captured image with respect to incidence angle (horizontal axis) is compared for an image capturing apparatus provided with the image capturing lens according to the related art and an image capturing apparatus provided with the image capturing lens according to embodiment 1.

According to FIG. 9, while for "IH=f·tan θ", the size IH of a captured image increases in size with respect to the incidence angle θ while plotting a curve of tan θ, for "IH=f·θ" the size IH of a captured image changes in a linear manner with respect to the incidence angle θ.

Figure 10:
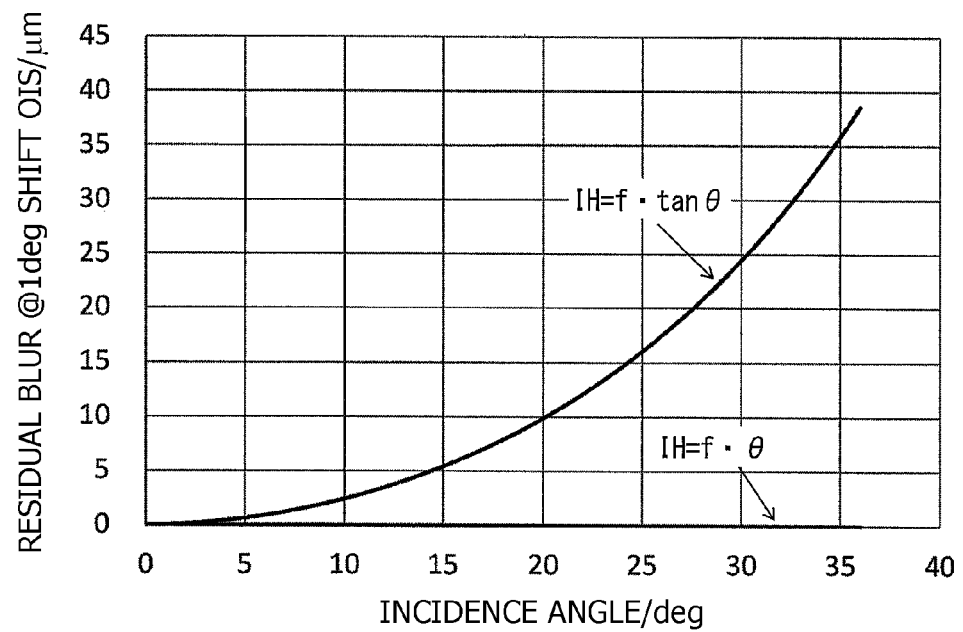
FIG. 10 is a graph in which a property of amount of blur in a captured image after the correction of blur when 1 deg of camera shake occurs with respect to incidence angle is compared for the image capturing apparatus provided with the image capturing lens according to the related art and the image capturing apparatus provided with the image capturing lens according to embodiment 1 of the present invention.

FIG. 10 is a graph in which a property of amount of blur (vertical axis) in a captured image after the correction of blur when 1 deg of camera shake occurs with respect to incidence angle (horizontal axis) is compared for the image capturing apparatus provided with the image capturing lens according to the related art and the image capturing apparatus provided with the image capturing lens according to embodiment 1.

According to FIG. 10, in "IH=f·tan θ", the amount of blur increases as the incidence angle θ increases, and the amount of blur exceeds 35 μm in a case in which the incidence angle θ is 35 deg. In this manner, in "IH=f·tan θ", blur of an order of a few tens of μm (a few tens of pixels) remains in peripheral portions of a captured image. Meanwhile, according to FIG. 10, in "IH=f·θ", the amount of blur is extremely small regardless of the incidence angle θ.

Figure 11:
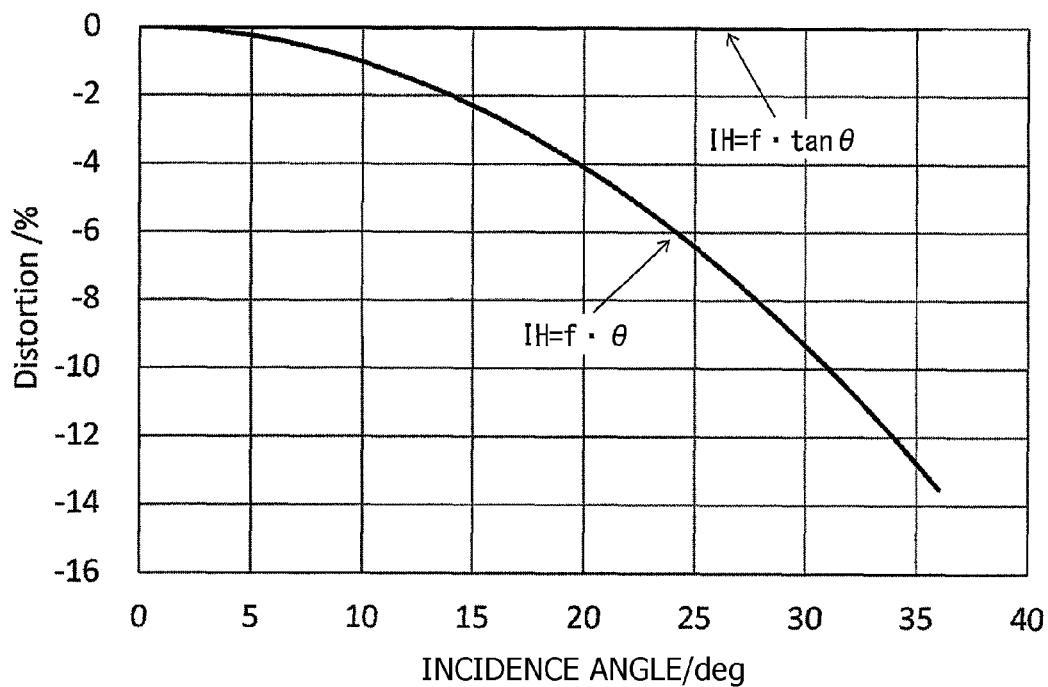
FIG. 11 is a graph in which a property of distortion with respect to incidence angle is compared for the image capturing apparatus provided with the image capturing lens according to the related art and the image capturing apparatus provided with the image capturing lens according to embodiment 1 of the present invention.

FIG. 11 is a graph in which a property of distortion (vertical axis) with respect to incidence angle (horizontal axis) is compared for the image capturing apparatus provided with the image capturing lens according to the related art and the image capturing apparatus provided with the image capturing lens according to embodiment 1.

According to FIG. 11, in "IH=f·tan θ", the fact that distortion is 0 regardless of the incidence angle θ is ideal. Meanwhile, according to FIG. 11, in "IH=f·θ", the fact that the image capturing lens 103 has minus distortion is displayed in the graph.

Figure 12:
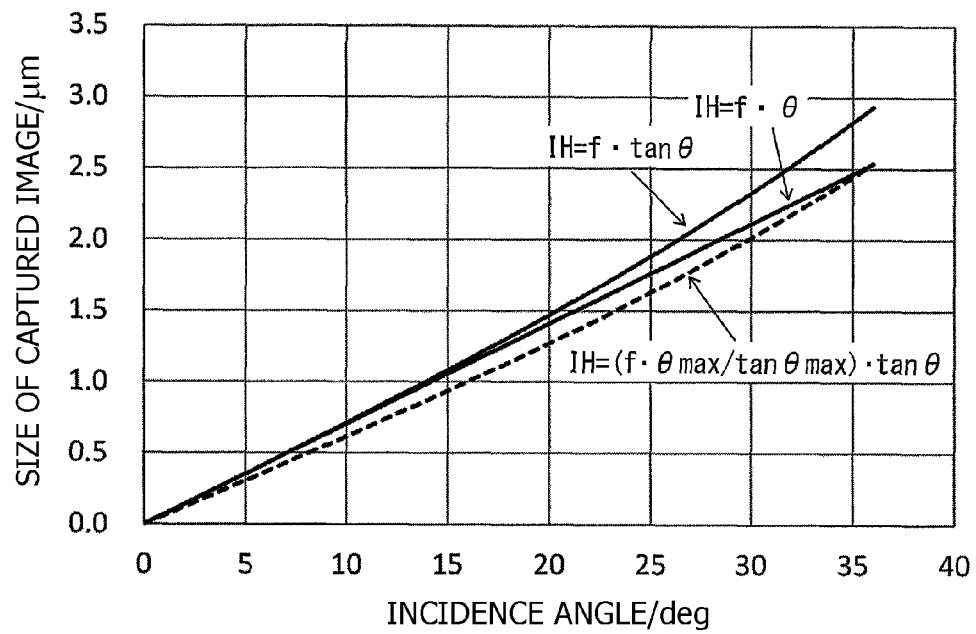
FIG. 12 is a graph in which a property related to a captured image obtained by carrying out an image process that is shown by Equation (1) below, is added to the graph that is shown in FIG. 9.

FIG. 12 is a graph in which a property related to a captured image obtained by carrying out an image process that is shown by Equation (1), is added to the graph that is shown in FIG. 9.

In FIG. 12, a property related to a captured image is set as "IH=(f·θmax/tan θmax)·tan θ".

Figure 13:
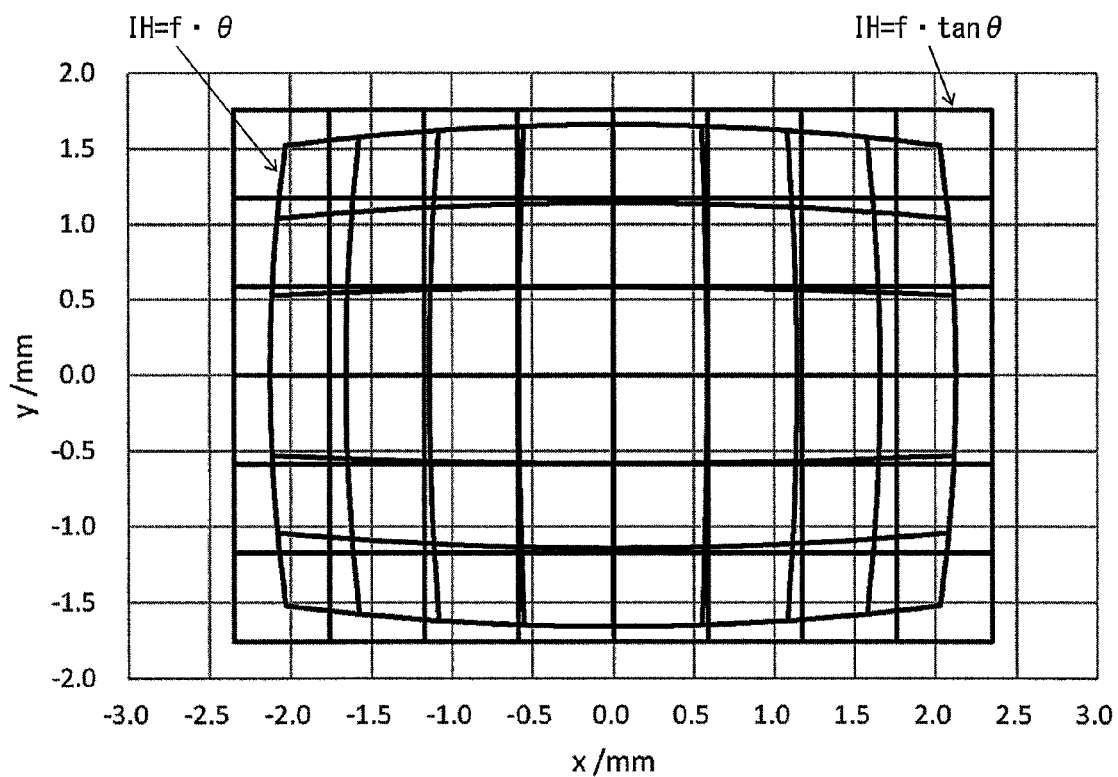
FIG. 13 is a graph in which an image capturing result of a lattice chart is compared for the image capturing apparatus provided with the image capturing lens according to the related art and the image capturing apparatus provided with the image capturing lens according to embodiment 1 of the present invention.

FIG. 13 is a graph in which an image capturing result of a lattice chart is compared for the image capturing apparatus provided with the image capturing lens according to the related art and the image capturing apparatus provided with the image capturing lens according to embodiment 1.

According to FIG. 13, a captured image of a lattice chart according to "IH=f·θ" becomes smaller with respect to a captured image of a lattice chart according to "IH=f·tan θ".

Figure 14:
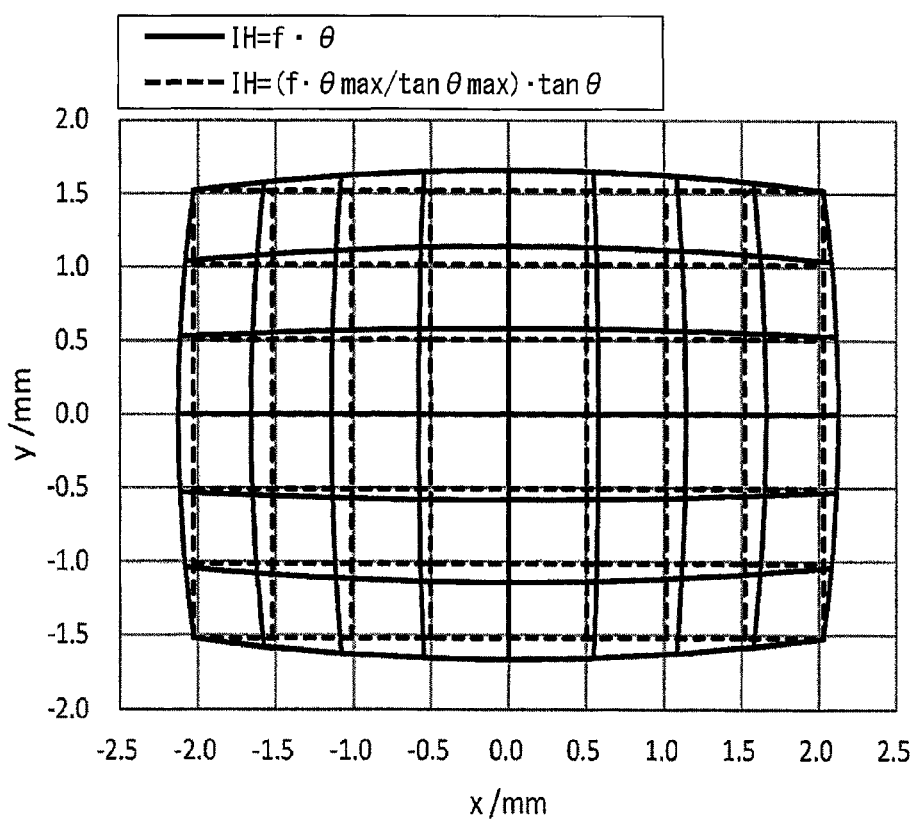
FIG. 14 is a graph in which an image capturing result of a lattice chart before and after the image process is compared for the image capturing apparatus provided with the image capturing lens according to embodiment 1 of the present invention.

FIG. 14 is a graph in which an image capturing result of a lattice chart before and after the image process is compared for the image capturing apparatus provided with the image capturing lens according to embodiment 1.

According to FIG. 14, it can be understood that a captured image of a lattice chart according to "IH=f·θ" is reduced in size to a captured image of a lattice chart according to "IH=(f·θmax/tan θmax)·tan θ" as a result of the image process that is shown by Equation (1).

Additionally, the image capturing apparatus 100 that is provided with the image capturing lens 103, and the camera module 101 are included in the category of the present invention. An image capturing apparatus such as a digital video camera or a digital still camera can be included as an example of the image capturing apparatus 100.

[Embodiment 2]

In embodiment 1, description of an example in which the OIS unit shifts the image capturing lens 103, was given but the OIS unit may shift the image sensor 104, or may shift both the image capturing lens 103 and image sensor 104.

Figure 15:
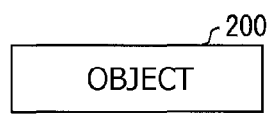
FIG. 15 is a cross-sectional view that briefly describes a configuration of an image capturing apparatus according to embodiment 2 of the present invention and the function of an OIS unit in the image capturing apparatus.
Figure 15:
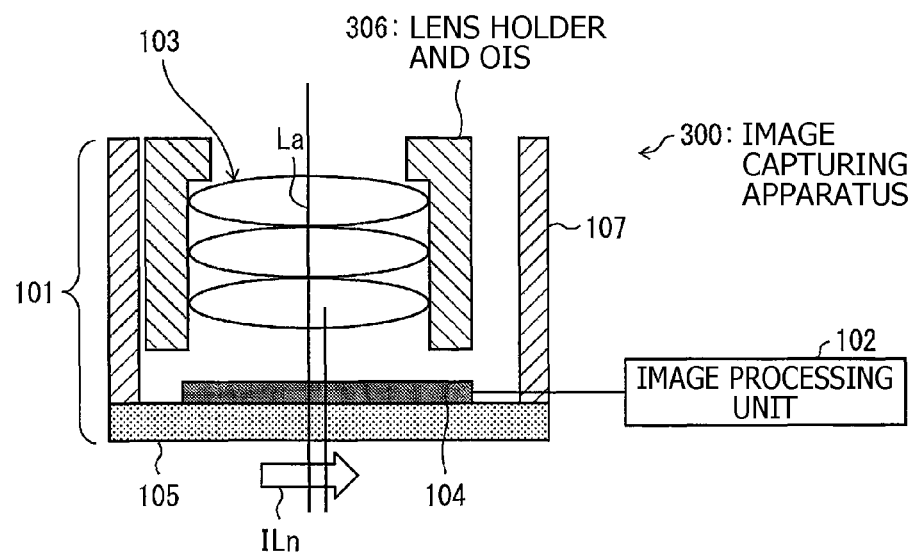

FIG. 15 is a cross-sectional view that briefly describes a configuration of an image capturing apparatus according to embodiment 2 and the function of an OIS unit in the image capturing apparatus.

An image capturing apparatus 300 that is shown in FIG. 15 differs from the image capturing apparatus 100 that is shown in FIGS. 2(a) and 2(b) in the following ways.

That is, the image capturing apparatus 300 is provided with a lens holder and an OIS 306 in place of the lens holder and the OIS 106.

The lens holder and the OIS 306 include a lens holder unit and an OIS unit. The lens holder unit of the lens holder and the OIS 306 is the same as the lens holder unit of the lens holder and the OIS 106. The OIS unit of the lens holder and the OIS 306 is a component that, for example, shifts the image sensor 104 in a normal direction ILn by moving the substrate 105 in the normal direction ILn with respect to the optical axis La of the image capturing lens 103.

The direction of the normal direction ILn is directly opposite to the direction of the normal direction Ln. In this case, shifting the image sensor 104 in the normal direction ILn is synonymous with shifting the image capturing lens 103 in the normal direction Ln.

In the abovementioned manner, even if the image sensor 104 is shifted in place of the image capturing lens 103, and furthermore, even if the shift of the image capturing lens 103 and shift of the image sensor 104 are combined, the image capturing apparatus 300 exhibits equivalent effects to the image capturing apparatus 100.

[Conclusion]

A camera module according to embodiment 1 of the present invention is provided with an image capturing lens, an image sensor that receives light that passes through the image capturing lens, and an optical camera shake correction mechanism (the lens holder and the OIS 106) that shifts at least one of the image capturing lens and the image sensor in a normal direction with respect to an optical axis of the image capturing lens, depending on an angle at which a principal ray from an object is incident to the image capturing lens, and a size of an image that the image capturing lens forms, is proportionate to the above-mentioned angle.

As a result of the above-mentioned configuration, since the size of an image of an object is constant regardless of the above-mentioned angle, it is possible to sufficiently correct blur in a captured image by merely shifting the image capturing lens.

Accordingly, a camera module is compact and has a low manufacturing cost, and is capable of correcting blur in a captured image more favorably.

In addition, since it is not necessary set the distortion of the image capturing lens to be plus distortion in an intermediate image height region, it is possible to suppress blur in an intermediate portion of a captured image.

According to aspect 1, in a camera module according to aspect 2 of the present invention, the distortion of the image capturing lens is minus distortion.

According to the above-mentioned configuration, since it is possible to make a peripheral light quantity ratio of a captured image larger, it is suitable for reducing noise that is caused by shading correction.

According to aspect 1 or 2, in a camera module according to aspect 3 of the present invention, the image capturing lens is an fθ lens.

According to the above-mentioned configuration, it is possible to easily realize an image capturing lens according to each aspect of the present invention.

According to any one of aspects 1 to 3, in a camera module according to aspect 4 of the present invention, the image capturing lens includes at least one lens, and, in one of the lenses, a surface that faces a side of the object side has a concave form, and a central portion of a surface that faces a side of the image sensor has a concave form while a peripheral portion that surrounds the central portion, has a convex form.

According to the above-mentioned configuration, since it is possible to bend rays of light, which pass through the circumference portions of the image capturing lens more sharply in an optical axis direction, it is possible to easily realize an image capturing lens having minus distortion.

An image capturing apparatus according to aspect 5 of the present invention includes the camera module of any one of aspects 1 to 4.

According to the above-mentioned configuration, it is possible to realize an image capturing apparatus that exhibits the same effects as any one of the camera modules of aspect 1 to 4.

According to aspect 5, an image capturing apparatus according to aspect 6 of the present invention includes an image processing unit that carries out an image process on an output signal of the image sensor of the above-mentioned camera module.

According to the above-mentioned configuration, it is possible to achieve an improvement in the resolving power of peripheral portions of a captured image while retaining the resolving power of a central portion of a captured image. Additionally, according to the above-mentioned configuration, the image processing unit can be realized by a device that performs a simple image process. Therefore, the image processing unit may merely perform a constant strain correction process, and the burden on the image processing unit is small.

According to aspect 6, in an image capturing apparatus according to aspect 7, the image processing unit reduces the size of a captured image of the image capturing apparatus on the basis of an angle of view and the angle in a diagonal direction of the camera module.

According to the above-mentioned configuration, it is possible to reduce the size of a captured image. Therefore, an amount of data of a captured image is reduced. In addition, since it is possible to ensure a margin of an effective image circle diameter with respect to a captured image, it is possible to perform suitable correction of larger camera shake.

The present invention is not limited to each of the embodiments mentioned above, various modifications are possible within a range that is shown in the claims, and embodiments obtained by combining technical means that are respectively disclosed in different embodiments as appropriate, are also included in the technical scope of the present invention. Furthermore, it is possible to form new technical features by combining technical means that are respectively disclosed in each embodiment.

INDUSTRIAL APPLICABILITY

The present invention can be used in a camera module and an image capturing apparatus that are provided with an OIS that shifts at least one of an image capturing lens and an image sensor. An image capturing apparatus such as a digital video camera or a digital still camera can be included as an example of the image capturing apparatus.

REFERENCE SIGNS LIST

100 IMAGE CAPTURING APPARATUS
101 CAMERA MODULE
102 IMAGE PROCESSING UNIT
103 IMAGE CAPTURING LENS
104 IMAGE SENSOR
106 LENS HOLDER AND OIS
109 CAPTURED IMAGE
110 CAPTURED IMAGE
111 CAPTURED IMAGE
200 OBJECT
200c PRINCIPAL RAY
200e PRINCIPAL RAY
L1 LENS
L2 LENS
La OPTICAL AXIS
Ln NORMAL DIRECTION
c4 CENTRAL PORTION
p4 CIRCUMFERENCE PORTIONS

The invention claimed is:

1. A camera module comprising:
an image capturing lens;
an image sensor that receives light that passes through the image capturing lens; and
an optical camera shake correction mechanism that shifts at least one of the image capturing lens and the image sensor in a normal direction with respect to an optical axis of the image capturing lens, depending on an angle at which a principal ray from an object is incident to the image capturing lens, wherein
a size of an image that the image capturing lens forms is proportionate to the angle at which a principal ray from an object is incident to the image capturing lens, and
$y \propto \theta$ where y is the size of the image that the image capturing lens forms and $\theta$ is the angle at which a principal ray from an object is incident to the image capturing lens.

2. The camera module according to claim 1,
wherein distortion of the image capturing lens is minus distortion.

3. The camera module according to claim 1,
wherein the image capturing lens is an f$\theta$ lens.

4. The camera module according to claim 1,
wherein the image capturing lens includes at least one lens,
wherein, in one of the lenses
a surface that faces a side of the object side has a concave form, and
a central portion of a surface that faces a side of the image sensor has a concave form while a circumference portion that surrounds the central portion, has a convex form.

5. An image capturing apparatus comprising the camera module according to claim 1; and
an image processor that carries out an image process on an output signal of the image sensor of the camera module.

6. The image capturing apparatus according to claim 5,
wherein the image processor reduces a size of a captured image of the image capturing apparatus on the basis of an angle of view and the angle in a diagonal direction of the camera module.

* * * * *